(12) United States Patent
Wippich (10) Patent No.: US 9,072,070 B2
(45) Date of Patent: Jun. 30, 2015

(54) MOBILE WIRELESS DEVICES AND METHODS OF OPERATION

(71) Applicant: Wolfgang Wippich, Neubiberg (DE)

(72) Inventor: Wolfgang Wippich, Neubiberg (DE)

(73) Assignee: INTEL MOBILE COMMUNICATIONS GMBH, Neubiberg (DE)

( * ) Notice: Subject to any disclaimer, the term of this patent is extended or adjusted under 35 U.S.C. 154(b) by 288 days.

(21) Appl. No.: 13/688,244

(22) Filed: Nov. 29, 2012

(65) Prior Publication Data

US 2014/0148178 A1    May 29, 2014

(51) Int. Cl.
*H04W 76/04* (2009.01)
*H04W 68/02* (2009.01)
*H04W 76/02* (2009.01)

(52) U.S. Cl.
CPC .......... *H04W 68/025* (2013.01); *H04W 76/026* (2013.01)

(58) Field of Classification Search
CPC ... H04W 88/06; H04W 36/08; H04W 68/025; H04W 72/0446; H04W 76/026
USPC ...................... 455/552.1, 558, 458
See application file for complete search history.

(56) References Cited

U.S. PATENT DOCUMENTS

| | | | |
|---|---|---|---|
| 5,870,673 A * | 2/1999 | Haartsen | 455/426.1 |
| 2003/0125073 A1 * | 7/2003 | Tsai et al. | 455/552 |
| 2011/0090874 A1 * | 4/2011 | Yang et al. | 370/335 |
| 2012/0008721 A1 | 1/2012 | Wippich | |
| 2012/0289285 A1 * | 11/2012 | Clevorn et al. | 455/552.1 |
| 2013/0065644 A1 * | 3/2013 | Bishop et al. | 455/558 |

OTHER PUBLICATIONS

3GPP TS 25.211 V11.1.0, 3rd Generation Parnership Projection; Technical Specification Group Radio Access Network; Physical channels and mapping of transport channels onto physical channels (FDD) Release 11, Sep. 2012.
3GPP TS 25.304 V11.0.0, 3rd Generation Parnership Projection; Technical Specification Group Radio Access Network; User Equipment (UE) procedures in idle mode and procedures for cell reselection in connected mode Release 11, Sep. 2012.

* cited by examiner

*Primary Examiner* — Ajit Patel (57) ABSTRACT

A mobile terminal includes two subscriber identification module (SIM) interfaces, a transceiver, and a scheduling module. The transceiver is configured to provide communication with mobile communication networks identified by subscription information respectively provided through the two subscriber identification module (SIM) interfaces. The scheduling module controls the transceiver in receiving paging information from a mobile communication network. The scheduling module maintains concurrent paging reception with the mobile communication networks identified by subscription information respectively provided through one of the two subscriber identification module (SIM) interfaces by factoring in periodic occurrences of paging indicators and paging messages.

14 Claims, 8 Drawing Sheets

MOBILE WIRELESS DEVICES AND METHODS OF OPERATION

FIELD OF THE DISCLOSURE

This disclosure relates to devices and methods for mobile radio communication and, more particularly, to devices and methods for mobile network connection termination.

BACKGROUND

Advances in mobile radio communication have generated a robust and dynamic mobile network industry. In addition to traditional mobile telephone services, mobile network providers are now in the business of selling a variety of network-based services, including for example, data, video, and Internet access. In connection with these advances within the mobile network industry, there exists a need for mobile terminals to be able to effectively operate multiple subscriber identification module (SIM) cards with a single transceiver. Mobile network subscribers, for example, may wish to have a single phone that can effectively operate on two mobile providers' networks simultaneously. Existing devices and methods are cumbersome, ineffective, or provide poor mobile network connection termination.

SUMMARY

In a first implementation, a mobile terminal includes two subscriber identification module (SIM) interfaces, a transceiver, and a scheduling module. The transceiver is configured to provide communication with mobile communication networks identified by subscription information respectively provided through the two subscriber identification module (SIM) interfaces. The scheduling module controls the transceiver in receiving paging information from a mobile communication network. The scheduling module maintains concurrent paging reception with the mobile communication networks identified by subscription information respectively provided through one of the two subscriber identification module (SIM) interfaces by factoring in periodic occurrences of paging indicators and paging messages.

In another implementation, a method for operating a transceiver on two mobile communication networks includes controlling the transceiver to receive paging information from a first mobile communication network for a first period, receiving a first paging indicator from the first mobile communication network, controlling the transceiver to receive paging information from a second mobile communication network for a second period, and receiving a paging indicator or a paging message from the second mobile communication network.

In another implementation, a non-transitory computer readable medium storing a transceiver scheduling program, which when executed by a computer, causes the computer to perform a method of scheduling a transceiver. The method includes controlling the transceiver to receive paging information from a first mobile communication network for a first period, receiving a first paging indicator from the first mobile communication network, controlling the transceiver to receive paging information from a second mobile communication network for a second period, and receiving a paging indicator or a paging message from the second mobile communication network.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

Figure 1:
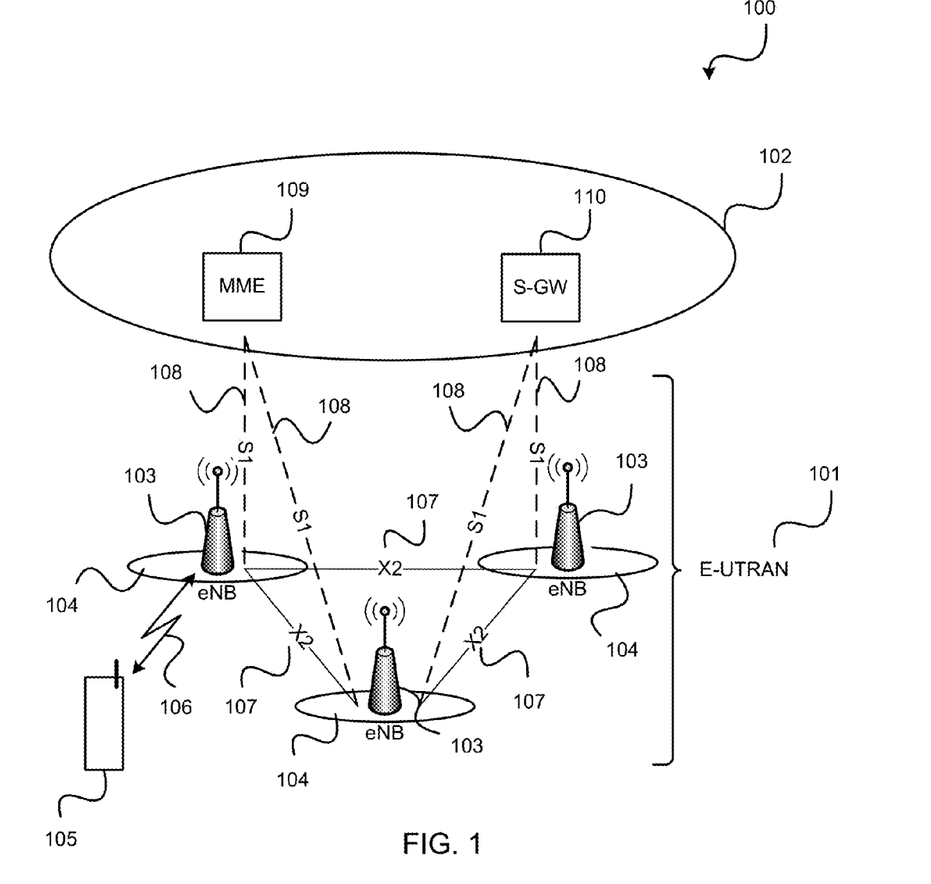
FIG. 1 is an LTE mobile communication network.

FIG. 1 is an LTE mobile communication network. The communication system 100 is a cellular mobile communication system (also referred to herein as cellular radio communication network or mobile communication network) including a radio access network (e.g. an E-UTRAN, Evolved UMTS Terrestrial Radio Access Network according to LTE (Long Term Evolution); or e.g. a UTRAN, UMTS Terrestrial Radio Access Network according to UMTS (Universal Mobile Telecommunications System)) 101 and a core network (e.g. an EPC, Evolved Packet Core, according to LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment or mobile wireless device) 105 located in a mobile radio cell 104 may communicate with the core network 102 and with other mobile terminals such as 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards mobile terminal 105.

Control and user data are transmitted between one of base stations 103 and a mobile terminal 105 located in mobile radio cell 104 operated by respective base station 103 over air interface 106 on the basis of a multiple access method.

Air interface 106 comprises several physical channels which can be grouped into uplink and downlink channels.

Channels in the downlink may, for instance, include:
Physical Control Channel (PDCCH) which conveys uplink and downlink radio resource allocation information;
Physical Control Format Indicator Channel (PCFICH) which is used to signal the length of the PDCCH;
Physical Hybrid ARQ Indicator Channel (PHICH) which is used to carry acknowledgements of uplink transmissions;

Physical Downlink Shared Channel (PDSCH) which is used for Layer-1 physical downlink transport data transmission;

Physical Multicast Channel (PMCH) which is used for broadcast transmission using a Single Frequency Network; and Physical Broadcast Channel (PBCH) which is used to broadcast basic system information within a cell including master information blocks (MIBs).

Channels in the uplink may, for instance, include:

Physical Random Access Channel (PRACH) which is used for initial access and uplink synchronization;

Physical Uplink Shared Channel (PUSCH) which carries the Layer-1 physical uplink transport data along with various control information; and Physical Uplink Control Channel (PUCCH) which also carries control information.

Base stations 103 are interconnected with each other by means of first interfaces 107, shown, for example as LTE X2 interfaces. Base stations 103 are also connected by means of second interfaces 108, shown, for example as LTE S1 interfaces, to the core network, e.g. to an MME (Mobility Management Entity) and to a Serving Gateway (S-GW) 110. The S1 interface supports a many-to-many relation between MMEs/S-GWs 109, 110 and base stations 103, i.e. a base station 103 can be connected to more than one MME/S-GW 109, 110 and an MME/S-GW can 109, 110 be connected to more than one base station 103. This enables network sharing in LTE.

For example, MME 109 may be responsible for controlling the mobility of mobile terminals, such as 105, located in the coverage area of E-UTRAN, while S-GW 110 is responsible for handling the transmission of user data between mobile terminals, such as 105, and core network 102.

Radio access network 101, i.e. E-UTRAN, can be seen to consist of base stations 103, i.e. eNBs, providing the E-UTRA user plane (PDCP/RLC/MAC) and control plane (RRC) protocol terminations towards mobile terminal 105.

Base station 103 may for example host the following functions:

Radio Resource Management: Radio Bearer Control, Radio Admission Control, Connection Mobility Control, dynamic allocation of resources to mobile terminals 105 in both uplink and downlink (scheduling);

IP header compression and encryption of user data stream;

Selection of an MME 109 at mobile terminal 105 attachment when no routing to an MME 109 can be determined from the information provided by the mobile terminal 105;

Routing of User Plane data towards Serving Gateway (S-GW) 110;

Scheduling and transmission of paging messages (originated from the MME);

Scheduling and transmission of broadcast information (originated from the MME 109 or O&M (Operation and Maintenance));

Measurement and measurement reporting configuration for mobility and scheduling;

Scheduling and transmission of PWS (Public Warning System, which includes ETWS (Earthquake and Tsunami Warning System) and CMAS (Commercial Mobile Alert System)) messages (originated from the MME 109);

CSG (Closed Subscriber Group) handling.

Each base station 103 of communication system 100 controls communications within its geographic coverage area, namely respective mobile radio cell 104 that may also be represented by a hexagonal shape. When mobile terminal 105 is located within a mobile radio cell 104 and is camping on the mobile radio cell 104 (in other words is registered with the mobile radio cell 104) it communicates with the base station 103 controlling that mobile radio cell 104.

While FIG. 1 describes a communication system according to LTE, it is appreciated that the various aspects of this disclosure may be implemented with other communication systems technology or standards. For instance, aspects of this may be implemented on a UMTS based communication system, amongst other mobile based communication systems. It is appreciated that many of the components in LTE may have functional equivalents with these other communication systems technology or standards. Paging, for instance, exists in many communication systems standards, including both LTE and UMTS.

For LTE paging, the physical downlink control channel (PDCCH) is monitored at regular intervals by the mobile terminal. If the PDCCH indicates that a paging message is being transmitted, the mobile terminal should receive and decode the sub-frame which is transported on the paging channel (PCH) which in turn is carried on the physical downlink shared channel (PDSCH).

For UMTS, the secondary common control physical channel (S-CCPCH) is monitored at regular intervals by the mobile terminal. If the S-CCPCH indicates that a paging message is being transmitted, the mobile terminal should receive and decode the paging sub-frame which is transported on the paging channel (PCH) which in turn is carried on the S-CCPCH. More particularly, the paging indicator channel (PICH) frame is broadcast by the network, and contains paging indicator bits for paging indication. The PICH is mapped, along with the PCH, to the S-CCPCH.

While some aspects of this disclosure given below are explained with reference to UMTS, it is appreciated that these aspect of this disclosure are not limited to UMTS, and may readily extend to, for example, LTE or other mobile based communication systems.

Figure 3:
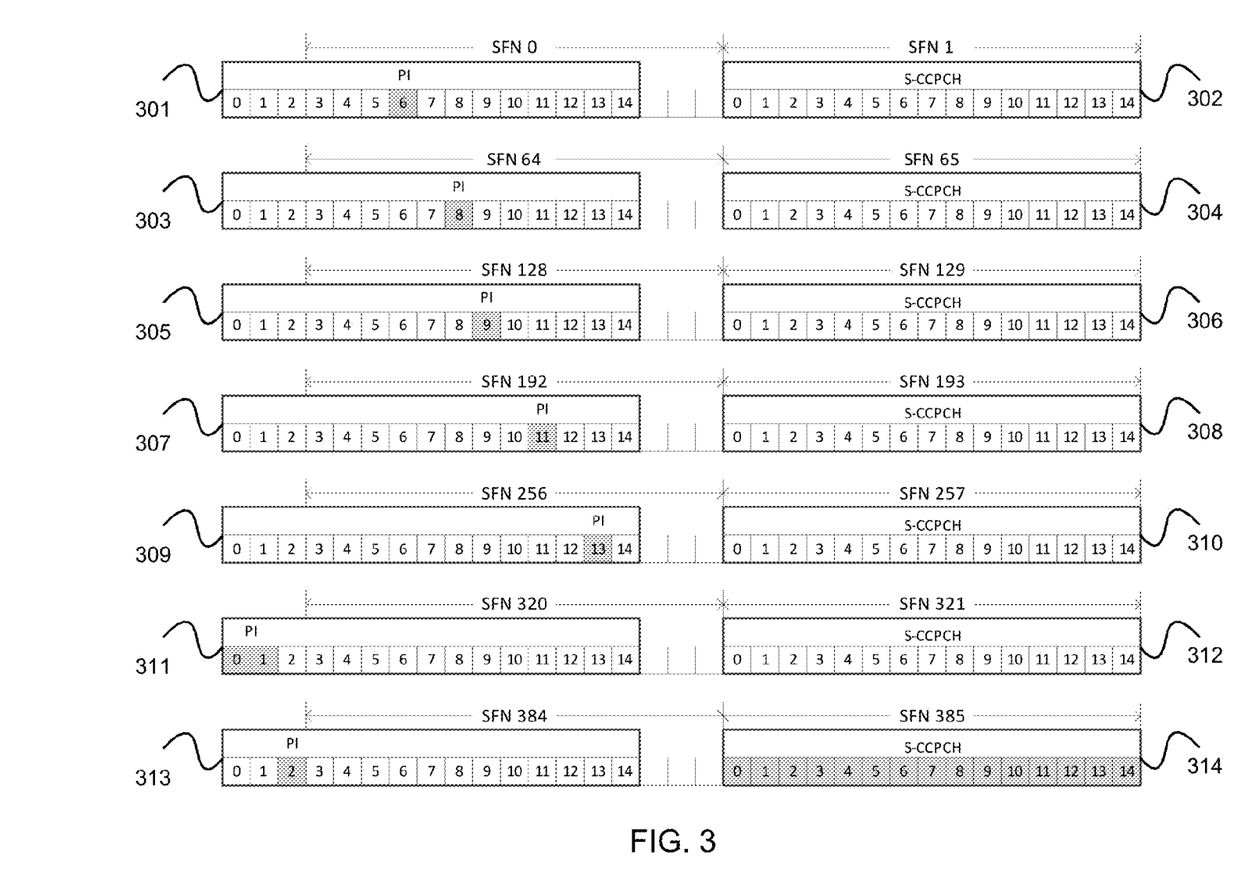
FIG. 3 illustrates examples of reception patterns according to UMTS paging.

FIG. 3 illustrates examples of reception patterns according to UMTS paging. UMTS system frames 301-314 are composed of UMTS time slots numbered 0-14 within each UMTS frame. For purposes of illustration, it is assumed, that the 0th secondary common control physical channel (S-CCPCH) is configured, resulting in no timing offset of the S-CCPCH from the UMTS system frame number (SFN). Furthermore, a discontinuous reception cycle (DRX) of 64 frames is assumed. In the frame preceding the S-CCPCH with a shift of 3 UMTS time slots, the paging indicator channel (PICH) frame is broadcast by the network. The PICH frame contains paging indicator bits for paging indication, shown as 'PI' in FIG. 3 (hereinafter "Pi bits").

Figure 2:
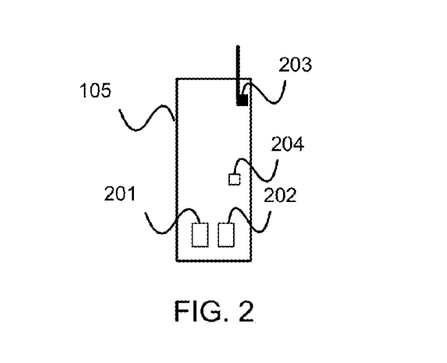
FIG. 2 is a mobile terminal operating with two SIM cards.

FIG. 2 is a mobile terminal operating with two SIM cards. Mobile terminal 105 has two SIM card slots 201, 202, capable of receiving two SIM cards. That is, mobile terminal 105 includes two subscriber identification module (SIM) interfaces, SIM card slots 201 and 202. Mobile terminal 105 also includes a transceiver 203, and a scheduling module 204. The SIM card slots are configured to allow the mobile terminal 105 to share a single transceiver in operating the two SIM cards. That is, mobile terminal 105 is configured to operate on two mobile providers' networks simultaneously by utilizing SIM cards from the two mobile providers inserted in respective SIM card slots 201, 202.

The scheduling module 204 configures the transceiver to receive paging information from one of the two mobile communication networks for a given period. The scheduling module maintains concurrent paging reception from the two mobile communication networks by applying a reception scheduling technique. The reception scheduling technique factors in periodic occurrences of paging indicators and paging messages from the two mobile communication networks.

A module within mobile terminal 105 applies a reception scheduling technique. A module may be a unit of distinct functionality that may be presented in software, hardware, or combinations thereof. When the functionality of a module is performed in any part through software, the module includes a machine readable medium. As described in further detail below, the aforementioned module that applies the reception scheduling technique accounts for time occurrences of paging indicators and paging messages for the two mobile providers' networks.

Mobile radio communication standards, such as UMTS and LTE, for example, often use pre-indicated paging messages. When a mobile terminal is in idle mode, the mobile terminal periodically checks if paging messages are being broadcast by the network. Generally in instances where the two mobile providers' networks operate on different frequencies, and the paging indicators of the networks are broadcast with little or no time between them, only the paging indicator of one of the networks can be received at a time. As a result, a paging message from one of the networks may be missed and the establishment of a mobile network connection may be unsuccessful.

In UMTS, for example, paging messages are announced by the broadcast of paging indicators preceding the paging messages. This generally allows a mobile terminal to switch off reception for the duration of the paging message when a negative paging indicator is received. This technique saves the mobile terminal the power needed for the reception of the paging message. Details concerning the paging indicator in UMTS, for example, are found in the 3GPP TS 25.211 specification published by the 3rd Generation Partnership Project (3GPP), the contents of which is hereby incorporated by reference in its entirety.

According to an aspect of this disclosure, the reception of the paging indicator is not required and a paging addressed to the terminal can be detected also from the paging message alone. In instances where the paging indicators of different networks are broadcast on different frequencies and overlap in time or are broadcast with a too short time distance, for example, only the paging indicator of the network broadcast earlier in time may be received, while for the other network only the paging message may be received.

FIG. 3 illustrates examples of reception patterns according to UMTS paging. UMTS system frames 301-314 are composed of UMTS time slots numbered 0-14 within each UMTS frame. For purposes of illustration, it is assumed, that the 0th secondary common control physical channel (S-CCPCH) is configured, resulting in no timing offset of the S-CCPCH from the UMTS system frame number (SFN). Furthermore, a discontinuous reception cycle (DRX) of 64 frames is assumed. In the frame preceding the S-CCPCH with a shift of 3 UMTS time slots, the paging indicator channel (PICH) frame is broadcast by the network. The PICH frame contains paging indicator bits for paging indication, shown as 'PI' in FIG. 3 (hereinafter "Pi bits").

A configured contiguous number of Pi bits identify a group of cellular terminals. In order to detect, whether a given cellular terminal is not paged, only the part of the UMTS frame containing the relevant Pi bits needs to be received. In FIG. 3, the UMTS time slot or UMTS time slots containing the relevant Pi bits are highlighted. That is, time slots 6, 8, 9, 11, 13, 0-1, and 2 contain the relevant Pi bits in UMTS system frames 301, 303, 305, 307, 309, 311, and 313 respectively.

In this respect, the transceiver circuitry only needs to be active during part of the UMTS system frame for reception of the Pi bits, although there is no specified duration length. One implementation, for example, may activate the transceiver for the timeslot or timeslots containing the Pi bits and the preceding and subsequent time slots.

For different SFNs the relevant Pi bits may be mapped on different parts of the PICH frame. In UMTS system frame 311 the Pi bits overlap both time slot 0 and time slot 1 of the PICH frame. In UMTS system frame 313, in contrast to the preceding UMTS system frames, the relevant Pi bits were set such that the related group of mobile terminals should receive the S-CCPCH in the subsequent frame. That is, the related group of mobile terminals should receive UMTS system frame 314 as highlighted in FIG. 3, while the related group of mobile terminals do not need to receive, or be active for, any of the preceding UMTS system frames since their relevant Pi bits were not set. In other words, since the relevant Pi bits in UMTS system frames 301, 303, 305, 307, 309, and 311 are not set, the transceivers of the related group of mobile terminals do not have to be active for UMTS system frames 302, 304, 306, 308, 310, and 312.

FIGS. 4-11 illustrate various timing examples for a mobile terminal with dual SIM cards. In other words, with a single transceiver, the mobile terminal needs to receive pagings on two mobile networks, as indicated with the labels SIM 1 and SIM 2 in the figures. In other words, Mobile terminal 105 has two SIM card slots 201, 202, capable of receiving two SIM cards. Two SIM cards have been inserted into SIM card slots 201, 202, and provide subscriptions to two networks, which for simplicity, are referred to herein as SIM 1 network and SIM 2 network. While the description below relates to a mobile terminal having dual SIM cards, it is understood that this disclosure may be extended analogously to a mobile terminal having several SIM cards. Moreover, while the description uses the terminology of the 3GPP UMTS standard, this disclosure may also be applied for other radio technologies, including radio standards which make use of pre-indicated paging messages.

In the case of UMTS, the PICH (paging indicator channel) and S-CCPCH (secondary common control physical channel) of the SIM 1 network may be broadcast on a different UARFCN (UTRA absolute radio frequency channel number) than the PICH and S-CCPCH of the SIM 2 network. Without restricting this disclosure, the following exemplary assumptions are made to more clearly illustrate the features of the subject matter disclosed herein:

the relevant SIM 1 network Pi bits for the mobile terminal are broadcast during the $8^{th}$ time slot;
  the relevant SIM 2 network Pi bits for the mobile terminal are broadcast during the $6^{th}$ time slot; and
  for FIGS. 4-10, all relevant paging indicators are negative.

Figure 4:
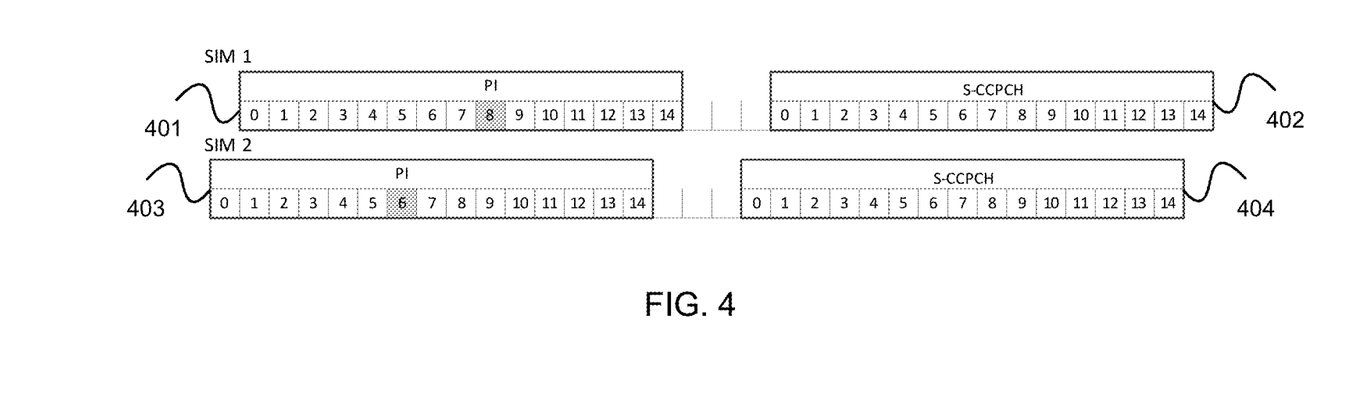
FIGS. 4-12 illustrate various timing examples for a mobile terminal with dual SIM cards.

In FIG. 4, the UMTS frames of the SIM 2 network start one time slot before those of the SIM 1 network. In FIGS. 5-10, the UMTS frames of the SIM 2 network progressively start one additional time slot later. Moreover, it is noted that the choice of frame offsets, which are multiples of UMTS time slots, is also to simplify the illustration and is not intended as a restriction to the subject matter herein. That is, there may be arbitrary offsets of fractions of time slots.

In FIG. 4, frames 401 and 402 are transmitted on the SIM 1 network, while frames 403 and 404 are transmitted on the SIM 2 network. The relevant Pi bits in frame 401 of SIM network 1 are contained in time slot 8, as indicated by the highlighted box, while the relevant Pi bits in frame 403 of SIM network 2 are contained in time slot 6. Since the frame 401 is slightly offset compared to frame 403, the mobile terminal 105 can receive and decode the relevant SIM 2 network Pi bits in time slot 6 of frame 403, and within two UMTS time slots may tune the receiver to the SIM 1 network frequency to receive and decode the relevant Pi bits in time slot 8 of frame 401. Since the Pi bits indicate a negative paging indicator, the S-CCPCH frame, as shown, does not need to be received for either the SIM 1 network or SIM 2 network.

Figure 5:
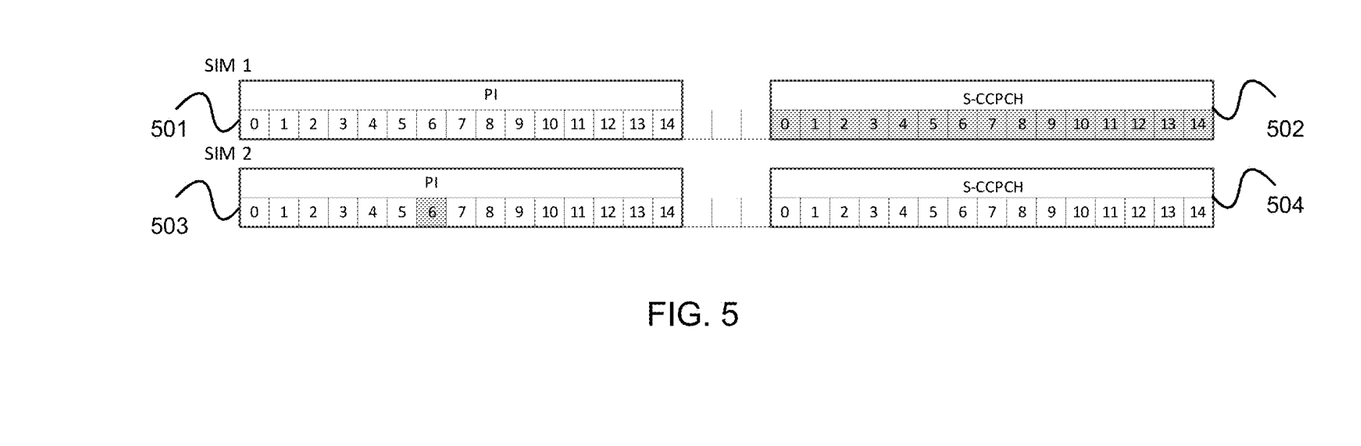

Similar to FIG. 4, FIG. 5 includes frames 501 and 502 which are transmitted on the SIM 1 network, while frames 503 and 504 are transmitted on the SIM 2 network. Likewise, relevant Pi bits in frame 501 of SIM network 1 are contained in time slot 8, while the relevant Pi bits in frame 503 of SIM network 2 are contained in time slot 6. However, the frame 501 is not significantly offset from and frame 503. As a result, the mobile terminal 105 can receive and decode the relevant Pi bits of SIM 2's network, but then may not be able to tune the receiver to the frequency of the SIM 1 network within one UMTS time slot to receive and decode the relevant Pi bits, accordingly, time slot 8 of frame 501 is not highlighted. That is, one UMTS time slot may not provide enough time for the mobile terminal 105 to receive and decode the relevant Pi bits from frame 503 and retune the receiver to the frequency of the SIM 1 network. Mobile terminal 105 can, however, check for pagings on the SIM 1 network by receiving the Pi bits on the SIM 2 network and then receive the S-CCPCH frame 502 on the SIM 1 network.

In general, when mobile terminal 105 begins reception of a S-CCPCH frame in order to check whether a paging message for mobile terminal 105 is contained therein, it may not mandatory for mobile terminal 105 to receive the entire S-CCPCH frame 502. In particular, implementations may specify which portion of the S-CCPCH relevant paging messages for mobile terminal 105 are to be found, if at all. Accordingly, for purposes of this disclosure, such an S-CCPCH frame may be received in full or in part as permitted in a given implementation. Moreover, it is appreciated that this feature is not limited to UMTS or S-CCPCH frames, but may extent to implementations having a paging payload preceded by an indicator.

Figure 6:
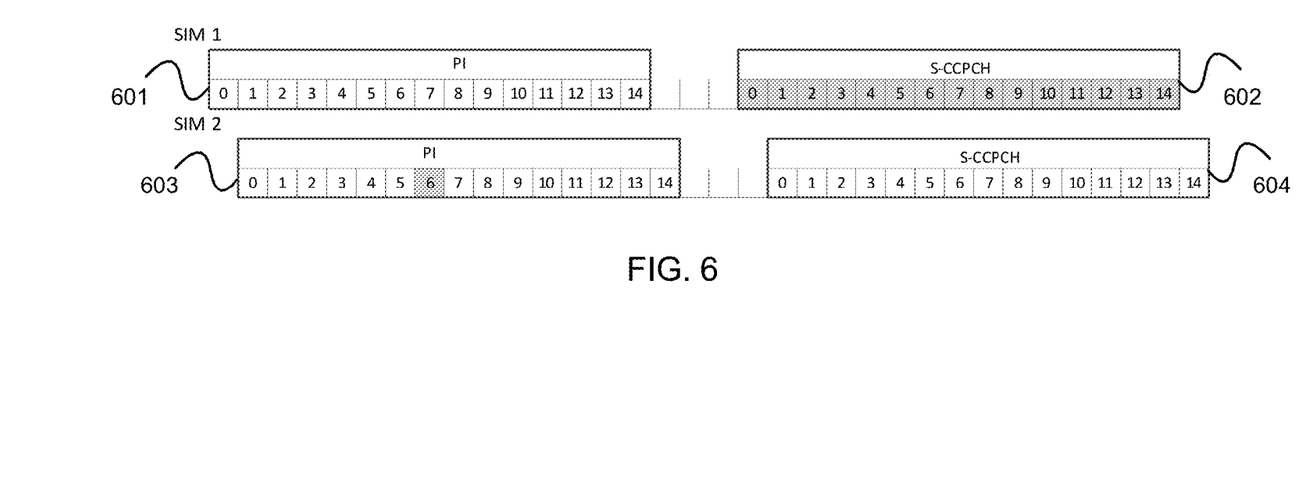

FIG. 6 likewise includes frames 601 and 602 which are transmitted on the SIM 1 network, while frames 603 and 604 are transmitted on the SIM 2 network. The relevant Pi bits in frame 601 of SIM network 1 are contained in time slot 8, while the relevant Pi bits in frame 603 of SIM network 2 are contained in time slot 6. Because frame 601 and 603 are slightly offset, the relevant Pi bits of the SIM 1 and SIM 2 networks are broadcast during subsequent time slots. That is, time slot 6 in frame 603 is followed immediately in proximity by time slot 8 of frame 601. Because of the proximity of the relevant Pi bits of the SIM 1 and SIM 2 networks, the mobile terminal may not be able to receive the Pi bits of both networks. This scenario, however, can be handled by receiving, in part or in whole, the S-CCPCH frame for the SIM network for which a relevant Pi bit was not received. In particular, FIG. 6 illustrates the scenario wherein Pi bit in frame 603 of SIM 2 network is received, as well as S-CCPCH frame 602 for the SIM 1 network.

Figure 7:
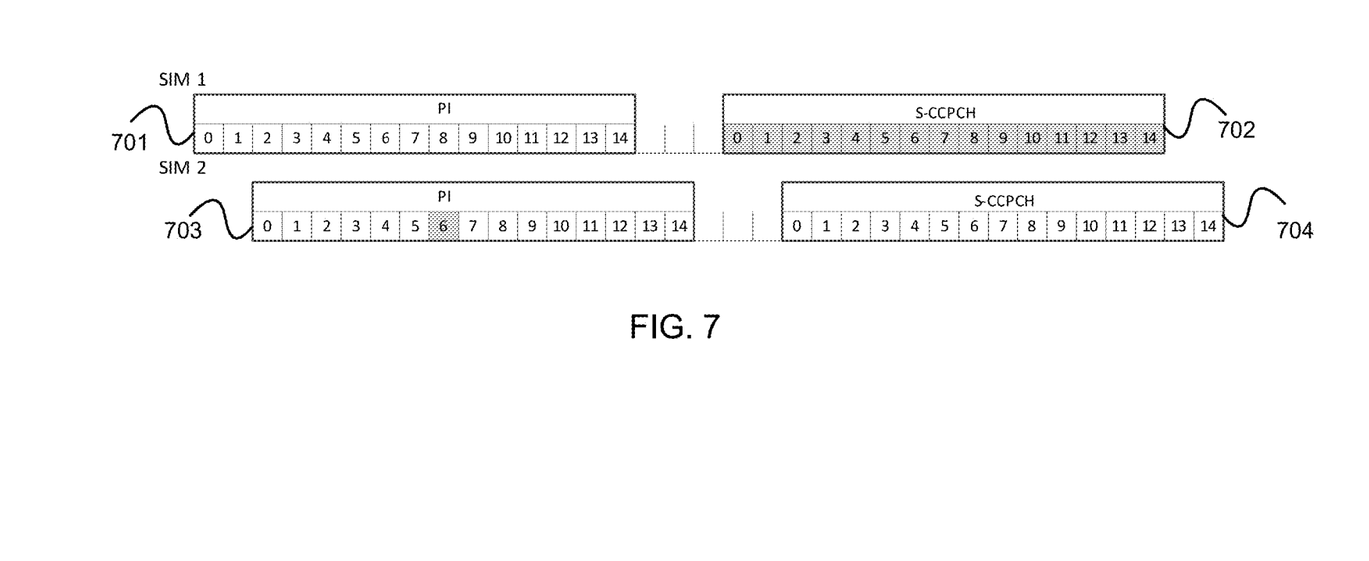
Figure 8:
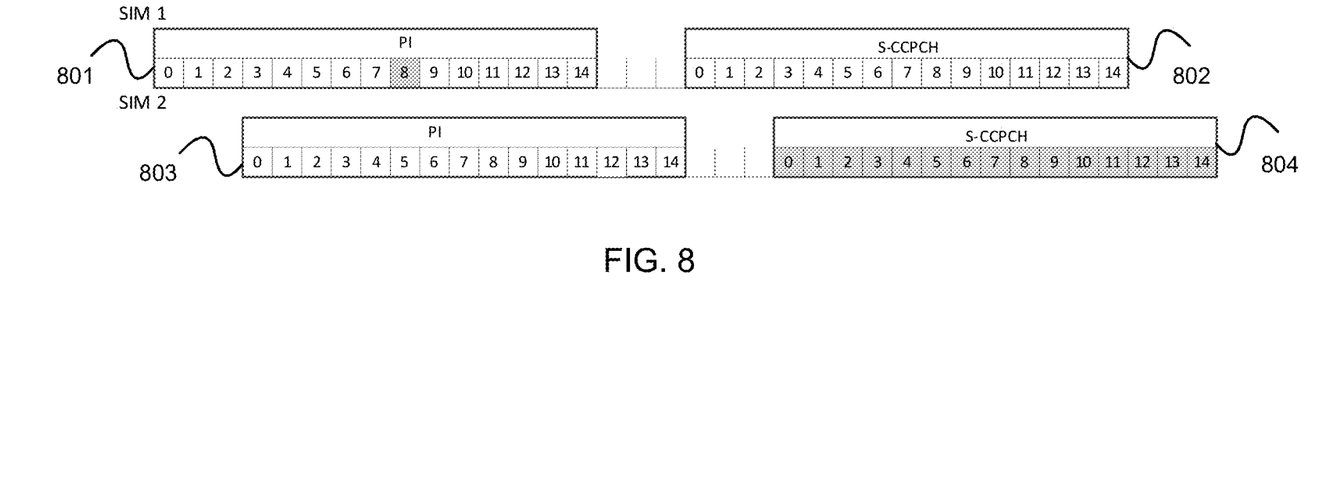

In FIG. 7, frames 701 and 702 are transmitted on the SIM 1 network, while frames 703 and 704 are transmitted on the SIM 2 network. The relevant Pi bits in frame 701 of SIM network 1 are contained in time slot 8, while the relevant Pi bits in frame 703 of SIM network 2 are contained in time slot 6. Since the time slots containing the relevant Pi bits of the SIM 1 and SIM 2 networks overlap in time, the mobile terminal 105 is not able to receive the Pi bits of both networks simultaneously with a single transceiver. The scenario, however, can be handled by receiving, in part or in whole, the S-CCPCH frame for the SIM network for which a relevant Pi bit was not received. In particular, FIG. 7 illustrates the scenario wherein Pi bit in frame 703 of SIM 2 network is received, as well as S-CCPCH frame 702 for the SIM 1 network In FIG. 8, frames 801 and 802 are transmitted on the SIM 1 network, while frames 803 and 804 are transmitted on the SIM 2 network. The relevant Pi bits in frame 801 of SIM network 1 are contained in time slot 8, while the relevant Pi bits in frame 803 of SIM network 2 are contained in time slot 6. The time slot containing the relevant Pi bits of the SIM 1 network is broadcast just before the time slot containing the relevant Pi bits of the SIM 2 network. It may not be possible, therefore, to receive the Pi bits of both networks. The mobile terminal 105 can, however, in this scenario check for pagings on both networks by receiving the Pi bits of the network for SIM 1 and the S-CCPCH frame 804 containing a potential paging message of the network for SIM 2. That is, FIG. 8 illustrates the scenario wherein Pi bit in frame 801 of SIM 1 network is received, as well as S-CCPCH frame 804 for the SIM 2 network In FIG. 9, frames 901 and 902 are transmitted on the SIM 1 network, while frames 903 and 904 are transmitted on the SIM 2 network. The relevant Pi bits in frame 901 of SIM network 1 are contained in time slot 8, while the relevant Pi bits in frame 903 of SIM network 2 are contained in time slot 6. While the time slot containing the relevant Pi bits of the SIM 1 network is broadcast before the time slot containing the relevant Pi bits of the SIM 2 network, the duration between the between the two sets of Pi bits may be too short for the mobile terminal 105 to receive and decode the relevant Pi bits for the SIM 1 network, and then tune to the frequency of the SIM 2 network to receive and decode those relevant Pi bits. Similar to some of the other scenarios described above, the mobile terminal 105 can, however, check for pagings on both networks by receiving the Pi bits of the network for SIM 1 in frame 901 and the S-CCPCH frame 904 containing a potential paging message of the network for SIM 2.

Figure 10:
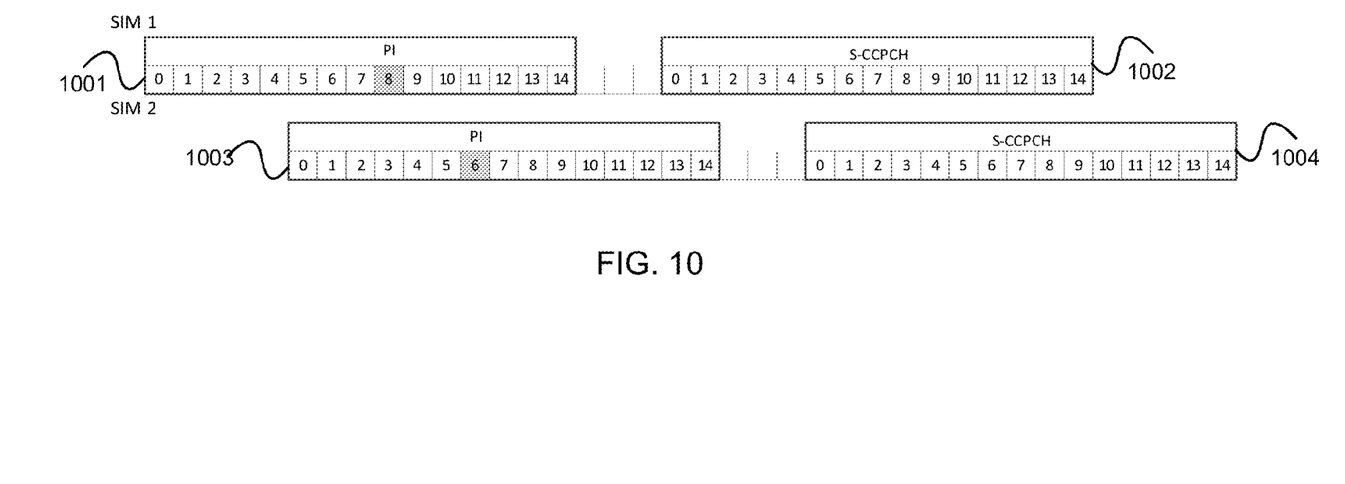

In FIG. 10, frames 1001 and 1002 are transmitted on the SIM 1 network, while frames 1003 and 1004 are transmitted on the SIM 2 network. The relevant Pi bits in frame 1001 of SIM network 1 are contained in time slot 8, while the relevant Pi bits in frame 1003 of SIM network 2 are contained in time slot 6. The time slot containing the relevant Pi bits of the SIM 1 network are broadcast before the time slot containing the relevant Pi bits of the SIM 2 network with a difference in time which allows the mobile terminal 105 to receive and decode the relevant Pi bits of both the SIM networks. In such a scenario, as show in FIG. 10, receiving of S-CCPCH frames may be avoided without loss of a potential paging message on either SIM 1 network or SIM 2 network.

Figure 9:
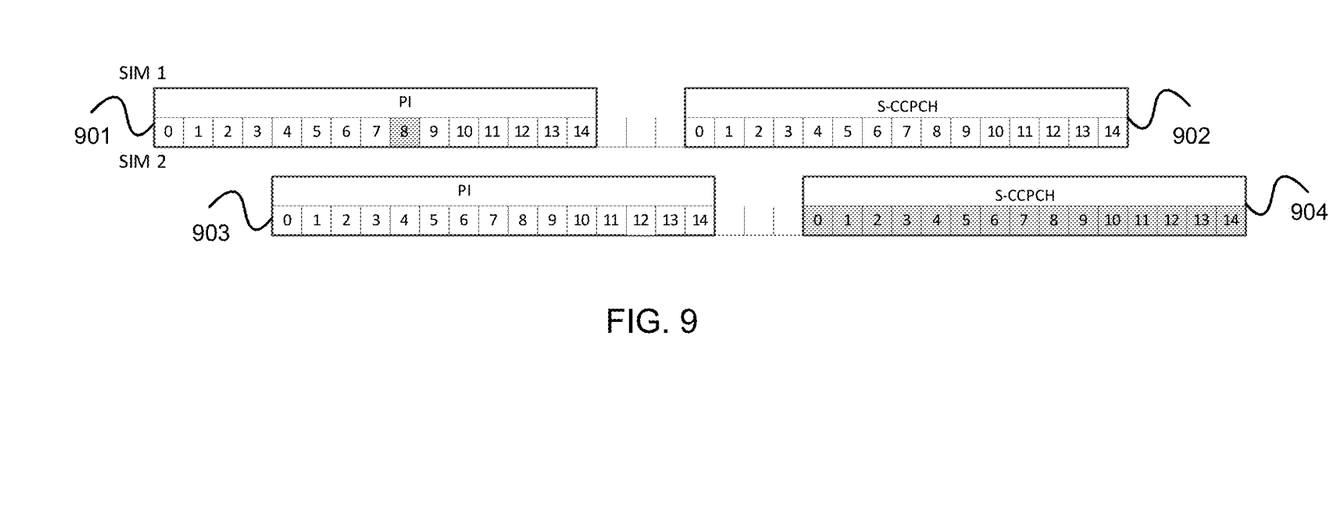
Figure 11:
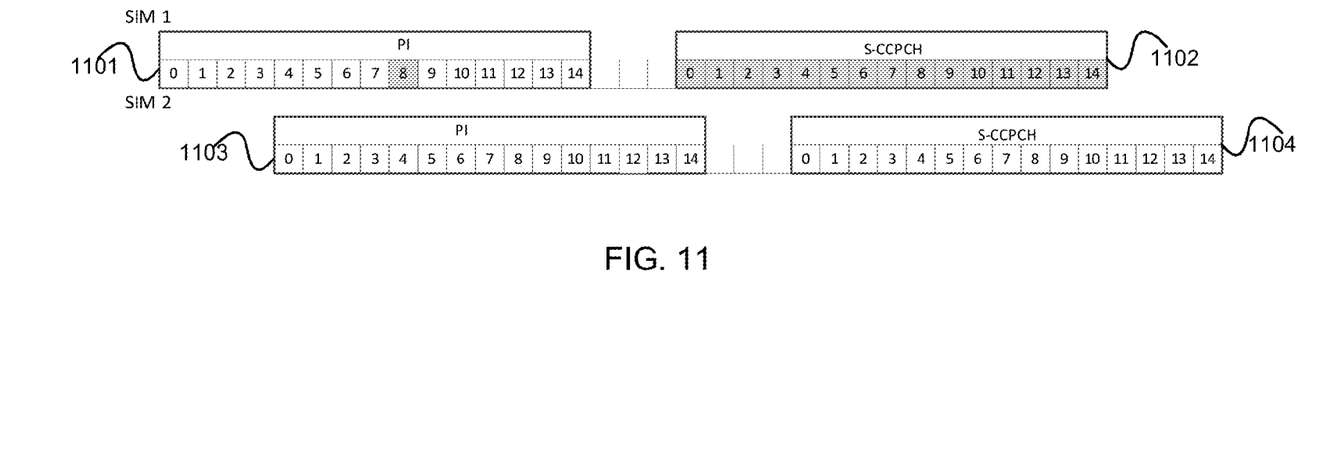

FIG. 11 illustrates the timing example of FIG. 9 but with a positive paging indication for the SIM 1 network. Frames 1101 and 1102 are transmitted on the SIM 1 network, while frames 1103 and 1104 are transmitted on the SIM 2 network. The relevant Pi bits in frame 1101 of SIM network 1 are contained in time slot 8, while the relevant Pi bits in frame 1103 of SIM network 2 are contained in time slot 6. The time slot containing the relevant Pi bits of the SIM 1 network is broadcast before the time slot containing the relevant Pi bits of the SIM 2 network with a difference in time which would not allow the mobile terminal 105 to receive and decode the relevant Pi bits of both the SIM networks. In this scenario, however, the relevant Pi bits for the SIM 1 network positively indicate that a paging message is to be sent. Accordingly, the S-CCPCH frame 1102 for paging in the SIM 1 network is received and checked for a valid paging message.

For typical network traffic, in the described scenario with frame 1101 containing a positive paging indicator in time slot 8, the S-CCPCH frame 1102 contains a valid paging message addressed to the mobile terminal 105.

If, however, a frame contains a positive paging indicator in the SIM 1 network, and then the subsequent S-CCPCH does not contain a valid paging message addressed to the mobile terminal 105, the network traffic may be characterized as a false-positive paging indicator.

Figure 12:
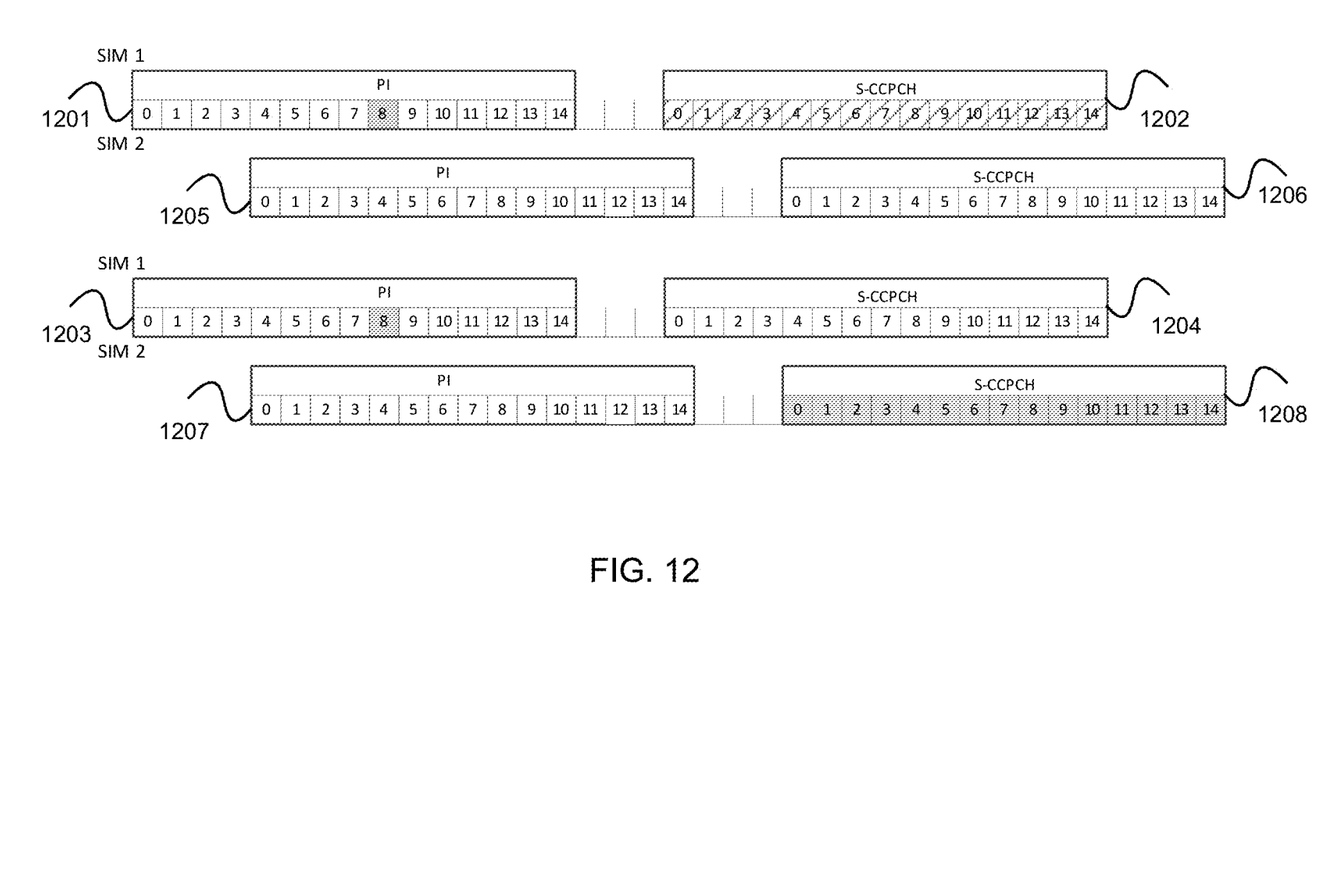

FIG. 12 illustrates the timing example of FIG. 11 after a repeated false-positive paging indication for the SIM 1 network. In FIG. 12, frame 1201 on the SIM 1 network is followed in order by frames 1202, 1203, and 1204. Similarly, frame 1205 on the SIM 2 network is followed in order by frames 1206, 1207, and 1208. A positive paging indicator is transmitted in both time slot 8 of frames 1201 and time slot 8 of 1203 on the SIM 1 network. The paging indicator in frame 1201, however, is a false-positive paging indicator, as indicated by the shading of S-CCPCH frame 1202. In this scenario where a false-positive paging indicator occurs, or reoccurs, the scheduling module 204 may choose to consider the positive paging indicator in time slot 8 of frame 1203 as also being false-positive. In doing so, mobile terminal 105 may receive paging message frame 1208 on the SIM 2 network. That is, in the case where there is a positive paging indicator 1201 on the SIM 1 network followed by a paging message frame 1202 that does not address the mobile terminal 105, i.e. a false-positive paging indicator, and as a result neither the paging indicator 1205 nor the paging message frame 1206 of the SIM 2 network is able to be received, the mobile terminal 105 may choose to receive the subsequent S-CCPCH frame 1208 of the SIM 2 network after a subsequent positive paging indicator 1203 on the SIM 1 network.

In choosing which network to receive paging information from for a given time period, the scheduling module 204 may implement the choice in a variety of ways including rotating reception between the multiple networks in a round-robin fashion, or randomly selecting reception between the multiple networks. After switch on, the decision of which network's PI to receive for the very first collision can be arbitrary.

Figure 13:
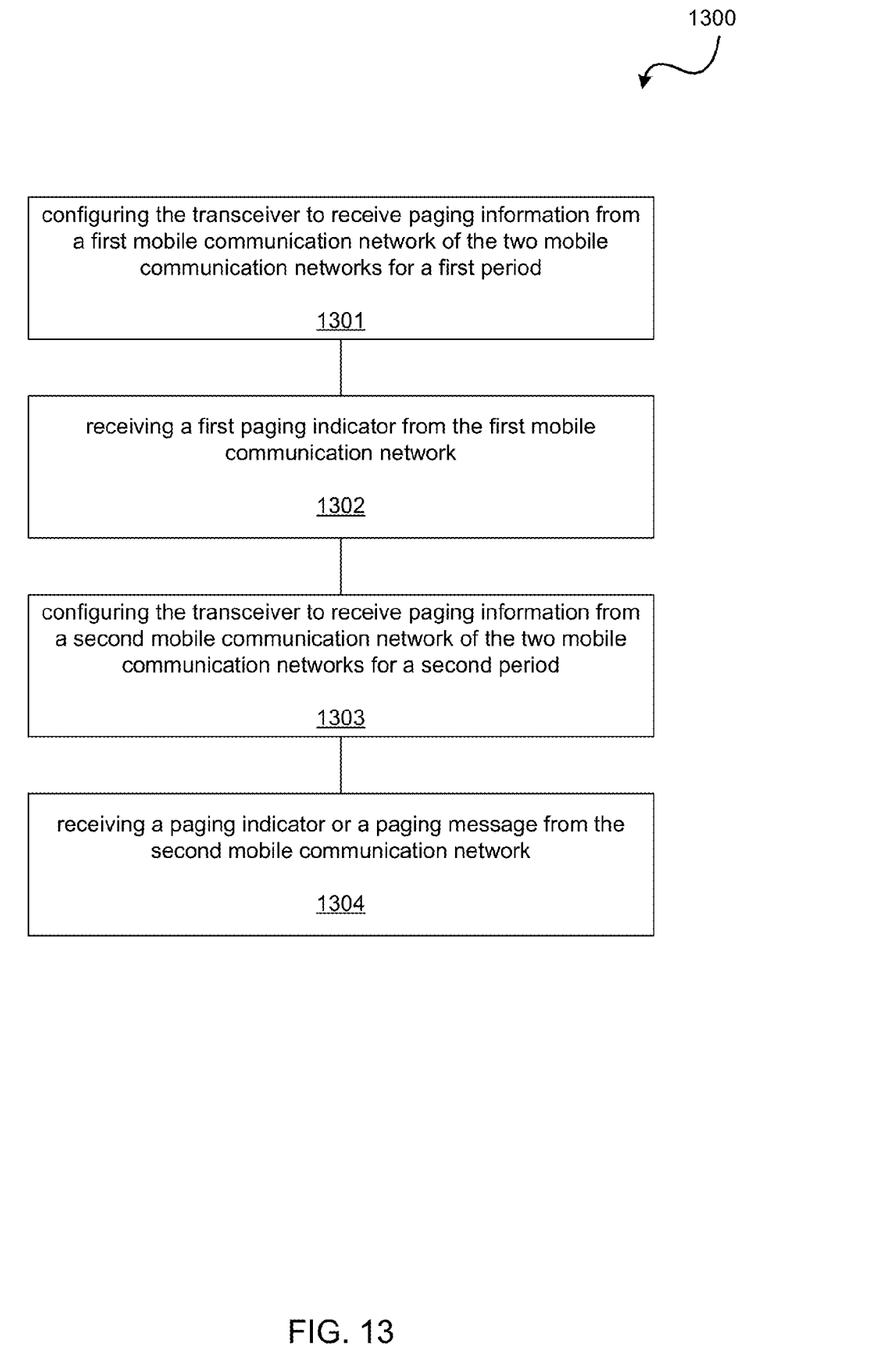
FIG. 13 illustrates a method for operating a transceiver on two mobile communication networks.

In conjunction with the description above, FIG. 13 illustrates a method 1300 for operating a transceiver on two mobile communication networks. As illustrated, the method 1300 includes configuring 1301 the transceiver to receive paging information from a first mobile communication network of the two mobile communication networks for a first period, receiving 1302 a first paging indicator from the first mobile communication network, configuring 1303 the transceiver to receive paging information from a second mobile communication network of the two mobile communication networks for a second period, and receiving 1304 a paging indicator or a paging message from the second mobile communication network.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A mobile terminal comprising:
   two subscriber identification module (SIM) interfaces;
   a transceiver configured to provide communication with a first mobile communication network and a second mobile communication network identified by subscription information respectively provided through the two subscriber identification module (SIM) interfaces; and
   a scheduling module configured to control the transceiver in receiving paging information from at least one mobile communication network,
   wherein the scheduling module is configured to maintain concurrent paging reception with the first mobile communication network and the second mobile communication network identified by subscription information respectively provided through one of the two subscriber identification module (SIM) interfaces by factoring in periodic occurrences of paging indicators and paging messages,
   and wherein the scheduling module is further configured to:
   schedule immediate control of the transceiver to receive paging information from the second mobile communication network upon decoding a negative paging indicator from the first mobile communication network.

2. The mobile terminal in claim 1, the scheduling module further configured to:
   control the transceiver to receive paging information from the first mobile communication network for a first period;
   receive a first paging indicator from the first mobile communication network;
   control the transceiver to receive paging information from the second mobile communication network for a second period; and
   receive a paging indicator or a paging message from the second mobile communication network.

3. The mobile terminal in claim 2, the scheduling module further configured to:
   determine periodic paging cycles of the first mobile communication network and the second mobile communication network identified by subscription information respectively provided through the two subscriber identification module (SIM) interfaces,
   wherein the first mobile communication network periodically broadcasts paging indicators during a first periodic time, and the second mobile communication network periodically broadcasting paging indicators during a second periodic time, and
   wherein the first periodic time occurs in proximity to or before the second periodic time.

4. The mobile terminal in claim 3,
   wherein the scheduling module is configured to schedule immediate control of the transceiver to receive paging information from the second mobile communication network upon decoding a negative paging indicator from the first mobile communication network when the first periodic time occurs in proximity to or before the second periodic time.

5. The mobile terminal in claim 1, wherein the mobile terminal is configured to receive a paging indicator from the first mobile communication network and after a duration of two time slots control the transceiver to receive paging information from the second mobile communication network.

6. The mobile terminal in claim 1, wherein the mobile terminal is compatible with universal mobile telecommunications systems (UMTS).

7. The mobile terminal in claim 6, wherein the first mobile communication network and the second mobile communication network identified by subscription information respectively provided through the two subscriber identification module (SIM) interfaces broadcast paging indicators on their respective paging indicator channel (PICH).

8. The mobile terminal in claim 6, wherein the first mobile communication network and the second mobile communication network identified by subscription information respectively provided through the two subscriber identification module (SIM) interfaces broadcast paging messages on their respective secondary common control physical channel (S-CCPCH).

9. A method for operating a transceiver at a mobile terminal containing two subscriber identification module (SIM) interfaces, the transceiver configured to provide communication with a first mobile communication network and a second mobile communication network identified by subscription information respectively provided through the two SIM interfaces, the method comprising:
   controlling the transceiver to receive paging information from the first mobile communication network for a first period based on periodic occurrences of paging information associated with the first mobile communication network;
   receiving a first paging indicator from the first mobile communication network;
   scheduling, upon decoding a negative paging indicator from the first mobile communication network, immediate control of the transceiver to receive paging information from the second mobile communication network for a second period based on periodic occurrences of paging information associated with the second mobile communication network; and
   receiving a paging indicator or a paging message from the second mobile communication network,
   wherein the receiving a first paging indicator from the first mobile communication network and the receiving a paging indicator or a paging message from the second mobile communication network allows the mobile terminal to maintain concurrent paging reception with the first mobile communication network and the second mobile communication network.

10. The method of claim 9 further comprising:
    determining periodic paging cycles of the first mobile communication network and the second mobile communication network identified by subscription information respectively provided through the two SIM interfaces,
    wherein the first mobile communication network periodically broadcasts paging indicators during a first periodic time, and the second mobile communication network periodically broadcasting paging indicators during a second periodic time, and
    wherein the first periodic time occurs in proximity to or before the second periodic time.

11. The method of claim 10, wherein the immediate control of the transceiver to receive paging information from the second mobile communication network upon decoding a negative paging indicator from the first mobile communication network is scheduled when the first periodic time occurs in proximity to or before the second periodic time.

12. A non-transitory computer readable medium storing a transceiver scheduling program, which when executed by a computer, causes the computer to perform a method of scheduling a transceiver at a mobile terminal containing two subscriber identification module (SIM) interfaces, wherein the transceiver is configured to provide communication with a first mobile communication network and a second mobile communication network identified by subscription information provided through the two SIM interfaces, the method comprising:
    controlling the transceiver to receive paging information from the first mobile communication network for a first period based on period occurrences of paging information associated with the first mobile communication network;
    receiving a first paging indicator from the first mobile communication network;
    scheduling, upon decoding a negative paging indicator from the first mobile communication network, immediate control of the transceiver to receive paging information from the second mobile communication network for a second period based on periodic occurrences of paging information associated with the second mobile communication network; and
    receiving a paging indicator or a paging message from the second mobile communication network,
    wherein the receiving a first paging indicator from the first mobile communication network and the receiving a paging indicator or a paging message from the second mobile communication network allows the mobile terminal to maintain concurrent paging reception with the first mobile communication network and the second mobile communication network.

13. The non-transitory computer readable medium of claim 12, the method further comprising:
    determining periodic paging cycles of the first mobile communication network and the second mobile communication network identified by subscription information respectively provided through the two SIM interfaces,
    wherein the first mobile communication network periodically broadcasts paging indicators during a first periodic time, and the second mobile communication network periodically broadcasting paging indicators during a second periodic time, and
    wherein the first periodic time occurs in proximity to or before the second periodic time.

14. The non-transitory computer readable medium of claim 13, wherein the immediate control of the transceiver to receive paging information from the second mobile communication network is scheduled when the first periodic time occurs in proximity to or before the second periodic time.

* * * * *